(12) United States Patent
Alumbaugh et al.

(10) Patent No.: US 7,949,470 B2
(45) Date of Patent: May 24, 2011

(54) PROCESSING MEASUREMENT DATA IN A DEEP WATER APPLICATION

(75) Inventors: David Alumbaugh, Berkeley, CA (US); Jiuping Chen, Albany, CA (US); Kevin Eyl, Lafayette, CA (US); Stephen Allan Horne, Tokyo (JP); Edward Nichols, Berkeley, CA (US)

(73) Assignee: WesternGeco L.L.C., Houston, TX (US)

( * ) Notice: Subject to any disclaimer, the term of this patent is extended or adjusted under 35 U.S.C. 154(b) by 148 days.

(21) Appl. No.: 11/943,627

(22) Filed: Nov. 21, 2007

(65) Prior Publication Data

US 2009/0132166 A1 May 21, 2009

(51) Int. Cl.
*G01V 3/00* (2006.01)
(52) U.S. Cl. .......................................... 702/11; 324/334
(58) Field of Classification Search .................... 702/11, 702/12, 13; 324/334
See application file for complete search history.

(56) References Cited

U.S. PATENT DOCUMENTS

| | | | |
|---|---|---|---|
| 4,617,518 A | 10/1986 | Srnka | |
| 7,126,338 B2 * | 10/2006 | MacGregor et al. | 324/334 |
| 7,659,724 B2 * | 2/2010 | Alumbaugh et al. | 324/365 |
| 2003/0079912 A1 * | 5/2003 | Leuchtenberg | 175/38 |
| 2005/0077902 A1 * | 4/2005 | MacGregor et al. | 324/334 |
| 2006/0129322 A1 * | 6/2006 | MacGregor et al. | 702/13 |
| 2006/0186889 A1 | 8/2006 | Andreis | |
| 2006/0238200 A1 * | 10/2006 | Johnstad | 324/337 |
| 2007/0255499 A1 * | 11/2007 | Strack et al. | 702/11 |
| 2008/0015779 A1 | 1/2008 | Alumbaugh | |
| 2008/0015809 A1 | 1/2008 | Alumbaugh | |
| 2008/0239875 A1 | 10/2008 | Alumbaugh | |

FOREIGN PATENT DOCUMENTS

| | | | |
|---|---|---|---|
| GB | 2412740 A | * | 10/2005 |
| WO | 0214906 A1 | | 2/2002 |
| WO | 2005010560 A1 | | 2/2005 |
| WO | WO 2005010560 A1 | * | 2/2005 |
| WO | 2007097787 A2 | | 8/2007 |
| WO | 2008121770 A2 | | 10/2008 |

OTHER PUBLICATIONS

Chave, A., Constable, S. C., and Edwards, R. N.; Electrical Exploration Methods for the Seafloor; Electromagnetic Methods in Applied Geophysics, Society of Exploration Geophysicists; 1991, 931-966.
Edwards, N.; Marine Controlled Source Electromagnetics: Principles, Methodologies, Future Commercial Applications; Surveys in Geophysics, 2005, 675-700, vol. 26.
Bannister, Peter R.; New Simplified Formulas for ELF Subsurface-to-Subsurface Propagation; IEEE Journal of Ocean Engineering, 1984, 154-163, vol. OE-9.
EP Search Report, dated Jan. 6, 2011, Application No. 08169581.9.

* cited by examiner

*Primary Examiner* — Bryan Bui (57) ABSTRACT

To process subterranean survey data, measurement data is collected by a receiver positioned in deep water, where the collected measurement data is responsive to signals emitted by at least one signal source located at or near an air-water interface of the body of water. The measurement data is processed to reduce a predetermined signal component.

19 Claims, 6 Drawing Sheets

PROCESSING MEASUREMENT DATA IN A DEEP WATER APPLICATION

TECHNICAL FIELD

The invention relates generally to processing subterranean survey data, in which measurement data collected by a deep water receiver (in response to electromagnetic waves emitted by a shallow source) is processed to reduce a predetermined signal component, such as an air-wave component.

BACKGROUND

Various electromagnetic techniques exist to perform surveys of a subterranean structure underneath a surface for identifying layers of interest. Examples of layers of interest in the subterranean structure include subsurface resistive bodies, such as hydrocarbon-bearing reservoirs, gas injection zones, thin carbonate or salt layers, and fresh-water aquifers. One survey technique is a magnetotelluric (MT) survey technique that employs time measurements of electric and magnetic fields (which are responsive to naturally occurring electromagnetic fields) for determining the electrical conductivity distribution beneath the surface. Another survey technique is a controlled source electromagnetic (CSEM) survey technique, in which an electromagnetic transmitter, referred to as a "source," is used to generate electromagnetic signals. With either survey technique, surveying units, referred to as "receivers," are deployed on a surface (such as at the sea floor or on land) within an area of interest to make measurements from which information about the subterranean structures can be derived. The receivers may include a number of sensors for detecting any combination of electric fields, electric currents, and magnetic fields.

In marine environment CSEM surveys, modeling and acquisition studies have shown that thin resistive targets in a subterranean structure, such as hydrocarbon-bearing reservoirs, gas injection zones, thin carbonate or salt layers, fresh water aquifers, and so forth, are more easily detectable when a CSEM source is positioned close to the sea floor. In practice, the CSEM source is towed or "flown," as close to the sea floor as the conditions will allow. Typically, the CSEM source will be towed between 30 to 50 meters above the sea floor.

In a deep water marine environment, locating the EM source close to the sea floor can make the EM survey difficult and expensive for various reasons. For example, the EM source has to be hardened to withstand pressures experienced in deep water. In addition, CSEM sources require a large amount of current to create the necessary moment, and the current results in a significant amount of energy that is lost due to resistive heating along a tow cable, which can be up to 6,000 meters in length. Also, in a deep water application, the speed of the sea vessel cannot exceed 1 to 2 knots to prevent the CSEM source from rising towards the sea surface and away from the sea floor.

SUMMARY

In one aspect, a method of processing subterranean survey data includes receiving measurement data collected by a receiver positioned at a depth of greater than or equal to 300 meters in a body of water. The measurement data is collected in response to signal waves emitted by at least one signal source located at or near an air-water interface above the body of water. The measurement data is processed to reduce a predetermined signal component.

In another aspect, an article comprises at least one computer-readable storage medium containing instructions that when executed cause a computer to receive measurement data collected by a receiver positioned at a depth of greater than or equal to 300 meters in a body of water, wherein the collected measurement data is responsive to signals emitted by at least one signal source located at or near an air-water interface of the body of water, and process the measurement data to reduce a predetermined signal component.

In another aspect, a computer includes a storage to store measurement data collected by a receiver positioned in a body of water, where the collected measurement data is responsive to signals emitted by at least one signal source, where a vertical distance between the signal source and the receiver is greater than or equal to 250 meters. A processor is to process the measurement data to reduce a signal component that is insensitive to subsurface layers.

Other or alternative features will become apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments are possible.

In accordance with some disclosed examples, a technique is provided to process measurement data collected by one or more deep water receivers (located at a depth of 300 meters or greater in a body of water) in response to signal waves transmitted by a signal source (e.g., an electromagnetic or EM source), where the signal source is located at a shallow position in the body of water (at or near the air-water interface) of the body of water. Processing of such measurement data reduces (or eliminates) at least one predetermined signal component at the deep water receiver(s). The at least one predetermined signal component that is reduced or eliminated at a receiver can be an unwanted signal component that is insensitive to layers in a subterranean structure. One example of such an unwanted signal component is a signal component due to an air-wave effect.

The air-wave effect is caused by an EM signal portion generated by a signal source that follows a path extending upwardly from the signal source to the sea surface, horizontally through the air, and then back downwardly through the seawater to a receiver (usually located on a sea floor).

Some survey techniques according to the present disclosure can be used in a deep water environment in which receivers are placed on the sea floor (or proximate the sea floor), while an EM source is placed at or near the sea surface, which can be a relatively large distance away from the sea floor in the deep water environment. A deep water application is an application in which water depths (distance from sea surface to sea floor) are 300 meters or greater. A signal source is near the sea surface (or air-water interface) if the signal source is closer depth wise to the sea surface (or air-water interface) than it is to the receiver. Usually, in a deep water application, the vertical distance between the signal source and receiver is less than or equal to 100 meters.

The benefit of towing a signal source close to the sea surface is that the hardware of the signal source does not require a degree of hardening since the signal source does not have to withstand large pressures at great depths. Additionally, the tow cables can be made shorter to provide for less energy loss. Moreover, the surveying can proceed at greater speeds since the sea vessel can tow the signal source at higher speeds, which allows for shorter acquisition times and reduced acquisition costs. Towing of the signal source at higher speeds is possible since the signal source is provided at or close to the sea surface, so that there is less concern associated with the signal source rising when towed at high speeds.

Figure 1:
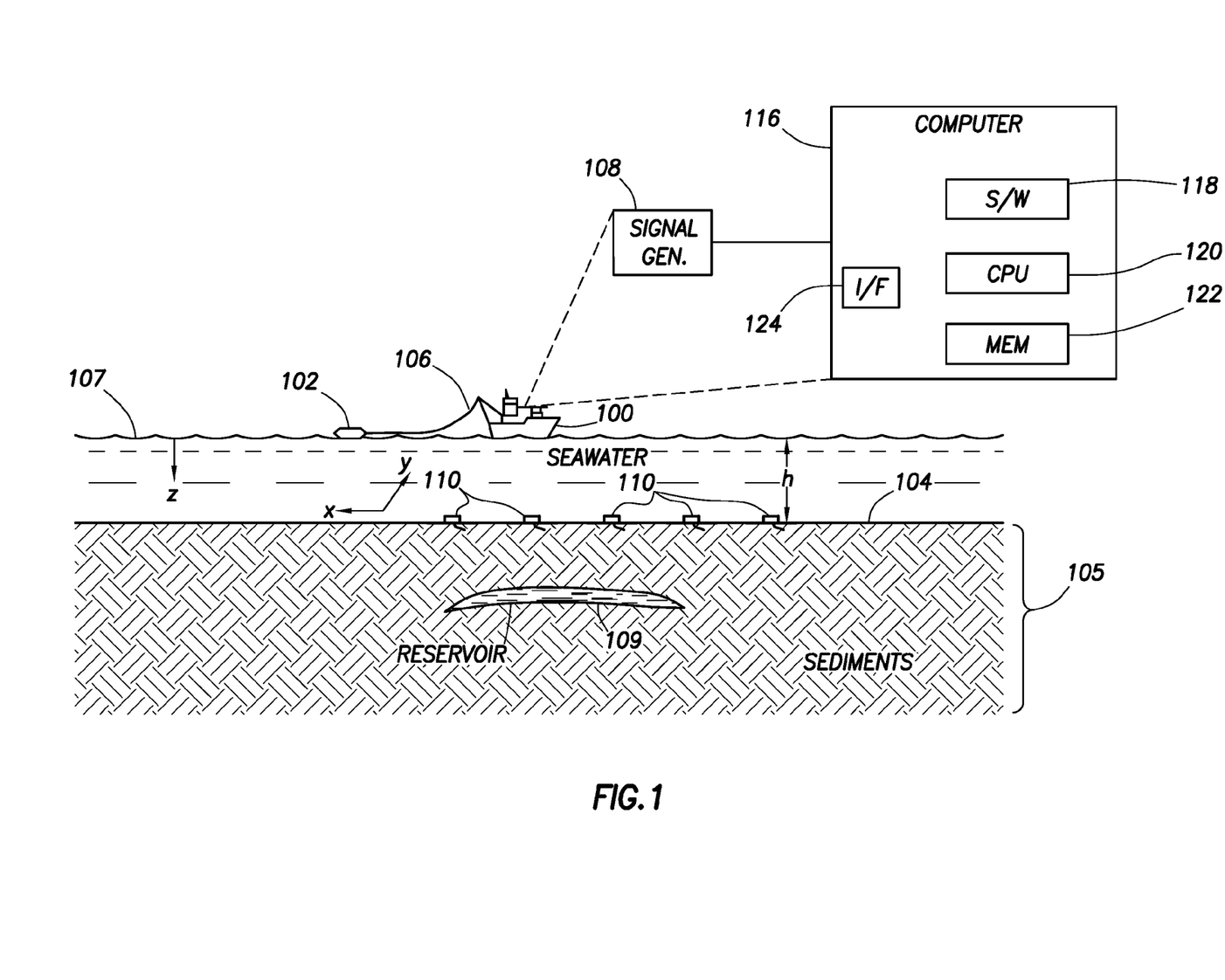
FIG. 1 depicts an example arrangement that includes a shallow signal source and a deep receiver in a body of water for performing surveying in a marine environment for surveying a subterranean structure underneath a sea floor.

With CSEM survey techniques, the CSEM source includes an EM transmitter that generates EM signals that propagate or diffuse through various layers, including the seawater and layers in a subterranean structure. FIG. 1 depicts a marine or subsea environment that includes a signal source (e.g., EM transmitter) 102 towed at or near the sea surface 107 for surveying subterranean structures 105. The subterranean structures 105 include a resistive body 109 of interest, such as a hydrocarbon-bearing layer, a gas injection zone, a thin carbonate or salt layer, a fresh water aquifer, and so forth. The EM signals are affected by subterranean layers, and the signal detected at a receiver 110 located on the surface (in this case the sea floor 104) is representative of that effect. In FIG. 1, plural receivers 110 are located on or near the sea floor 104. Each receiver 110 includes a sensor module having sensing elements to sense one or more of electric fields, electric currents, and magnetic fields. In one example, a plurality of receivers 110 are arranged on the sea floor 104 in a row (in a direction depicted as x). In other examples, the receivers 110 can have other arrangements, such as a square grid of receivers or even a random arrangement of receivers.

As further depicted in the marine arrangement of FIG. 1, a sea vessel 100 is capable of towing the EM transmitter 102 in seawater. In the example shown in FIG. 1, the EM transmitter 102 is a horizontal electrical dipole transmitter. Other types of transmitters are also possible. For example, a horizontal magnetic dipole transmitter may be used. Vertical electric and magnetic dipole receivers may also be used. In addition, other non-dipole transmitters may be used.

The example arrangement of FIG. 1 is a deep water arrangement in which a depth of the sea floor 104 (relative to the sea surface 107) is greater than or equal to 300 meters. By towing the transmitter 102 close to the sea surface 107, the transmitter 102 is relatively far away (vertically in the direction z) from the sea floor 104 and the subterranean structures 105. In some examples, the transmitter 102 may be towed within 10 meters of the surface. As noted above, various benefits are provided by transmitter 102 being towed at or near the sea surface 107. However, the relatively large distance between the transmitter 102 and receivers 110 and subterranean structures 105 presents challenges in being able to acquire accurate surveying data at the receivers 110. One such challenge involves removing the unwanted effects of signal components that are insensitive to layers in the subterranean structures 105 from data measured at a receiver 110. Processing techniques are employed to reduce or eliminate such unwanted effects.

The EM transmitter 102 is coupled by a tow cable 106 (or multiple tow cables) to a signal generator 108 on the sea vessel 100. The signal generator 108 controls the frequencies, magnitudes, and phases of the EM signals generated by the transmitter 102.

Each of the receivers 110 includes a storage device for storing data from measurements made by the receivers 110. The stored measurement data is retrieved at a later time, such as when the receivers 110 are retrieved to the sea vessel 100. The retrieved measurement data can be uploaded to a computer 116 on the sea vessel 100, which computer 116 has analysis software 118 capable of analyzing the measurement data for the purpose of determining information about the subterranean structures 105. The analysis software 118 in the computer 116 is executable on a central processing unit (CPU) 120 (or plural CPUs), which is coupled to a storage 122. An interface 124 that is coupled to the CPU 120 is provided to allow communication between the computer 116 and an external device. For example, the external device may be a removable storage device containing measurement data measured by the receivers 110. Alternatively, the interface 124 can be coupled to a communications device for enabling communications of measurement data between the computer 116 and the receivers 110, where the communications can be wired communications or wireless communications. The wired or wireless communications can be performed when the receivers 110 have been retrieved to the sea vessel 100. Alternatively, the wired or wireless communications can be performed while the receivers 110 remain on the sea floor 104.

Alternatively, instead of providing the computer 116 (and the analysis software 118) on the sea vessel 100, the computer 116 can instead be located at a remote location (e.g., at a land location). The measurement data from the receivers 110 can be communicated from the sea vessel 100 to the remote location. In one example, the information is communicated by a wireless link, such as a satellite link.

In some examples, two different processing techniques can be applied to measurement data collected by deep water receivers to remove an air-wave signal component at the receivers. A first of the two processing techniques includes a bucking technique that uses two data values collected in response to two different positions of the signal source. The amplitude of one of the data values is adjusted, and the two data values are then subtracted from each other to enable the air-wave component to be "bucked-out" (eliminated or reduced) while information about the subterranean structure remains.

The second processing technique involves processing that uses both measurements taken according a CSEM survey technique and measurements taken according to a magnetotelluric (MT) survey technique. With the MT survey technique, a receiver measures signals that are responsive to EM fields generated naturally, such as within the earth's upper atmosphere. If a target body of interest is a thin resistive layer (e.g., a thin layer containing hydrocarbons such as oil and gas, or an aquifer containing fresh water), then MT measurements (measurements made using the MT survey technique) are insensitive to the presence of the thin resistive layer. Naturally occurring EM fields excite predominantly horizontal current flows in the earth, which makes the MT survey technique intrinsically insensitive to thin resistive layers located in the subterranean structure. On the other hand, EM fields measured using the CSEM survey technique are sensitive to the presence of a thin resistive layer in the subterranean structure. However, the CSEM survey technique is sensitive to air-wave effects, especially when the EM transmitter 102 is shallow.

With the second processing technique, the air-wave effect is estimated based on measurements taken using the MT survey technique. The estimated air-wave effect can then be removed from the measurements taken using the CSEM; survey technique to produce an output value that can be used for more accurately determining the presence of thin resistive layers in the subterranean structure. This second processing technique is referred to as an MT-stripping technique.

In other examples, other processing techniques can be used to remove unwanted signal components from measurement data collected by a receiver.

The following provides some background regarding contribution of the air-wave effect to measured data. For example, the earth may be simplified to a two layer model including an electromagnetic dipole source located below the surface of a conductive medium of uniform conductivity (as in the case of an electric dipole source located in a body of water over a uniform half space of approximately the same electrical conductivity as water). If both the source depth (Z) and receiver depth (h) are smaller than the lateral separation (R) between the source and receiver, the electric and magnetic fields can be written as:

$$E, H \cong P_0 + P_1 + L, \quad (Eq. 1)$$

where E represents the electric field, H represents the magnetic field, $P_0$ represents the direct field response produced by a dipole source in a medium of uniform conductivity, in this case seawater, $P_1$ represents a modified image term that would be generated by a second source also located in a earth of uniform conductivity, but positioned a distance approximately equal to 2z above the true source, and L represents a lateral wave, usually called the "air wave." Note that when a subterranean structure is present below the sea bottom, most of the information about that structure can be thought of as being contained in the image term, $P_1$, while $P_0$ and L remain either completely unchanged, or only moderately modified, respectively.

The air wave L becomes attenuated while travelling straight upwardly from the signal source (102) to the air-water interface (sea surface 107 in FIG. 1). The lateral wave travels laterally along the air-water interface with the amplitude decreasing only through $1/R^3$ geometrical spreading, and the lateral wave becomes further attenuated while travelling vertically downward from the air-water interface to the receiver 110.

The lateral wave L induced by the air-wave effect is an example of an unwanted component that can be detected by a receiver 110 at the sea floor 104, because the lateral wave does not contain information relating to the subterranean structure 105 that is being surveyed.

When considering the earth to include a two-layer model, the $P_0$, $P_1$, and L components are easily calculated with analytic expressions that depend on the water conductivity, the depths of the signal source 102 and receivers 110 below the sea surface 107, and the relative lateral distances between the source and receivers. When a signal source is placed at or near the surface 107 of the sea, these components $P_0$, $P_1$, and L will dominate components that are affected by the subsurface 105.

Figure 2A:
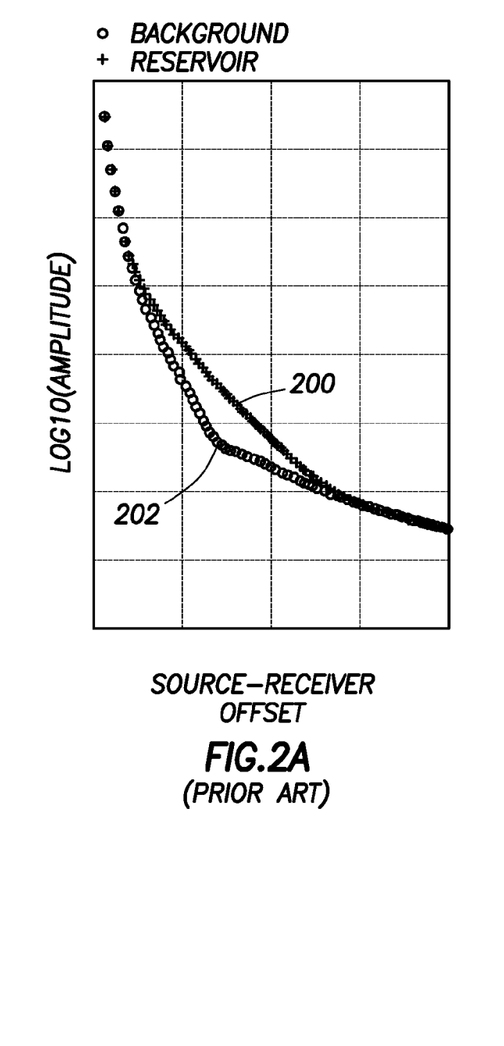
FIGS. 2A-2C are graphs illustrating example relationships of signal amplitudes as a function of source-receiver offsets for a conventional surveying arrangement.

FIG. 2A shows a graph that depicts a relationship between electric field amplitudes detected at a receiver and an offset between the receiver and source (where the off set is the lateral distance between the receiver and source). FIG. 2A depicts an example relationship of a conventional arrangement in which a single source is provided at a depth that is close to the depth of the receiver. In the example of FIG. 2A, it is assumed that the source is about 950 meters below the sea surface, and that the receiver is at the sea floor at 1,000 meters. A curve 200 in FIG. 2A represents simulated electric field amplitudes (as measured by the receiver) as a function of source-receiver offset when a resistive body is present in the subterranean structure. On the other hand, a curve 202 represents simulated amplitudes (as measured by the receiver) as a function of source-receiver offset when the resistive body is not present in the subterranean structure. Thus, as depicted in FIG. 2A, in a conventional arrangement that includes a source and a receiver that are relatively close to each other in depth (50 meters or so), electric amplitudes at the receiver induced by a target resistive body in the subterranean structure can be detected at certain source-receiver offsets (offsets where detectable separation exists between curves 200 and 202 in FIG. 2A).

Figure 2B:
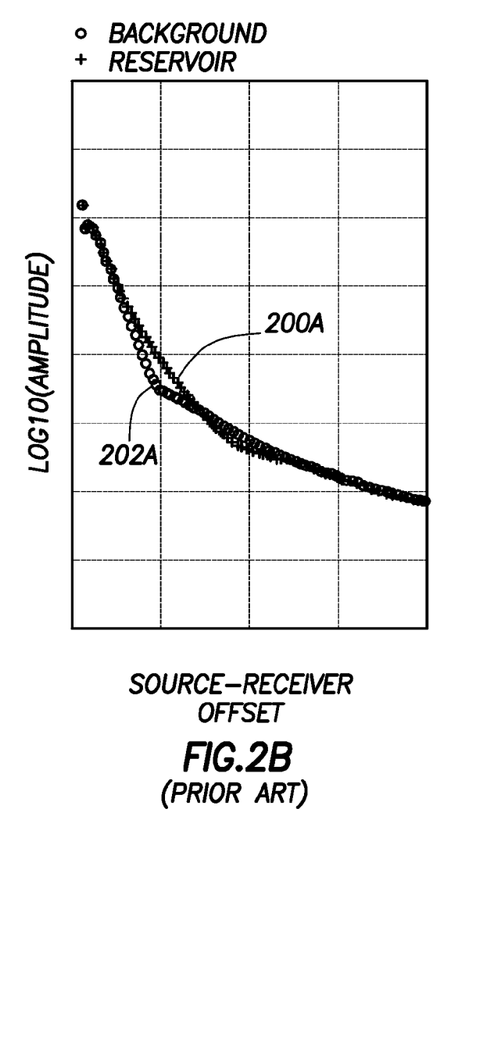

If, however, the receiver remains at the sea floor at 1,000 meters, but the source is raised to a depth of 300 meters (as measured from the sea surface), the relationship of simulated amplitudes as a function of source-receiver offset is depicted in FIG. 2B. In FIG. 2B, curve 200A (which represents amplitudes as a function of source-receiver offset when a resistive body is present) and curve 202A (which represents amplitudes as a function of source-receiver offset when the resistive body is not present) have less separation between them. As a result, a user would have a more difficult time accurately determining whether or not a resistive body is in the subterranean structure. Thus, it can be seen from the FIG. 2B graph that when the source is raised 700 meters above the receiver, unwanted signal components such as the lateral wave due to the air-wave effect become more dominant, which makes detection of the resistive body in the subterranean structure more difficult.

Figure 2C:
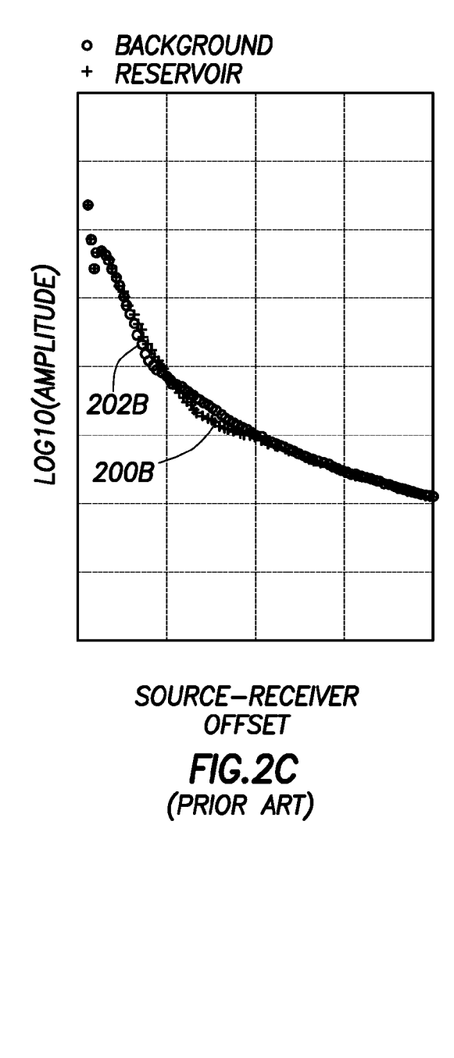

FIG. 2C illustrates an arrangement that includes a single source and receiver in which the source has been raised to just 5 meters below the sea surface, while the receiver remains at the sea floor 1,000 meters below the sea surface. In this case, the curve 200B (which represents simulated amplitudes corresponding to the resistive body being present in the subterranean structure) and curve 202B (which represents amplitudes corresponding to the resistive body not being present in the subterranean structure) have even less separation, which makes detection of the resistive body even more difficult.

Bucking Processing Technique

As noted above, according to one example, the air-wave component (or some other undesired component of the electric field measurement) can be reduced or eliminated by using the bucking processing technique, in which the air-wave (or other undesired component) effect may be "bucked" (cancelled or reduced) using two measurements at different lateral distances from the signal source to the receiver. In some implementations, the measurements made for the electric dipole source at two different horizontal distances may be combined to remove the air-wave effect (or other undesired component). The air-wave effect (or other undesired component) is removed because the spatial change in amplitude of the undesired component is predictable with a simple analytic expression, which is set forth below. Because the response of the reservoir/seafloor has different characteristics in terms of its spatial variations, it is possible to apply the appropriate geometrical corrections to and combine two separate data points along a horizontal line remove the air-wave effect (or other undesired component) while maintaining the response of the targets at depth.

Figure 3:
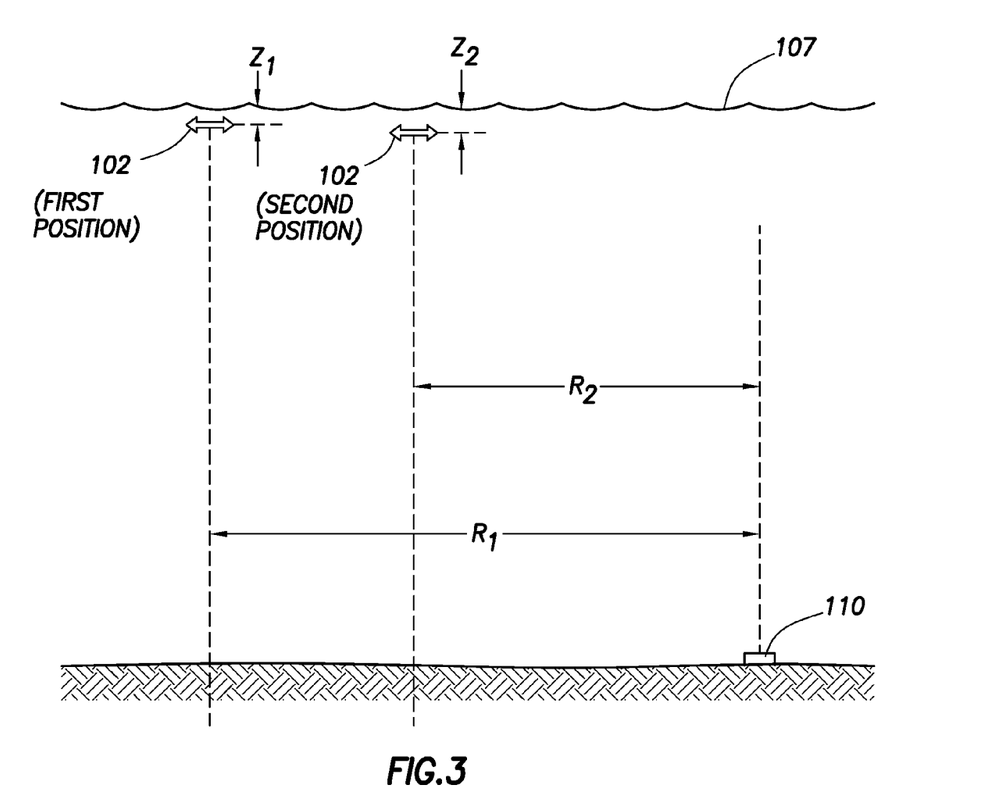
FIG. 3 illustrates two positions of a signal source relative to a receiver to allow two measurements to be taken for performing a "bucking" processing technique, according to the present disclosure.

More specifically, in some implementations, the air-wave effect depends on the horizontal (lateral) distance between the source and receiver (called R) and the depth of the transmitter (called z) from the sea surface 107. Therefore, if fairly accurate estimates of the source position R and the source depth z are known, the air-wave effect may be bucked out by combining multiple measurements. For example, as depicted in FIG. 3, the signal source 102 can be moved between a first position and a second position, with two corresponding measurements (called $E_1$ and $E_2$) taken by the receiver 110 with the signal source at the two positions. The two measurements may be combined to generate a measurement (called $E_{12}^B$) that is relatively insensitive to the air-wave effect, as set forth below:

$$E_{12}^B = E_1 \left[ e^{-k_{sw}(Z_2-Z_1)} \left(\frac{R_1}{R_2}\right)^3 \right] - E_2, \quad \text{(Eq. 2)}$$

where $R_1$ (see FIG. 3) represents the lateral offset between the signal source 102 (at the first position) and the receiver 110, and $Z_1$ represents the depth of the signal source 102 (from sea surface 107 to the signal source 102) at the first position. The first position of the signal source 102 (represented by $R_1$ and $Z_1$) corresponds to the first measurement $E_1$. $R_2$ represents the lateral offset between the signal source 102 (at the second position) and the receiver 110, and $Z_2$ represents the depth of the signal source 102 at the second position.

The propagation constant $k_{sw}$ in Eq. 2 is expressed as:

$$k_{sw} = \sqrt{2\pi i f \mu \sigma_{sw}}, \quad \text{(Eq. 3)}$$

where the notation i represents the square root of negative one ($\sqrt{-1}$), f represents the signal frequency, $\mu$ represents the magnetic permeability of the medium, which is assumed to be that of free space ($\mu=\mu p=4\pi\times10^{-7}$H/m), and $\sigma_{sw}$ represents the conductivity of seawater.

Figure 4:
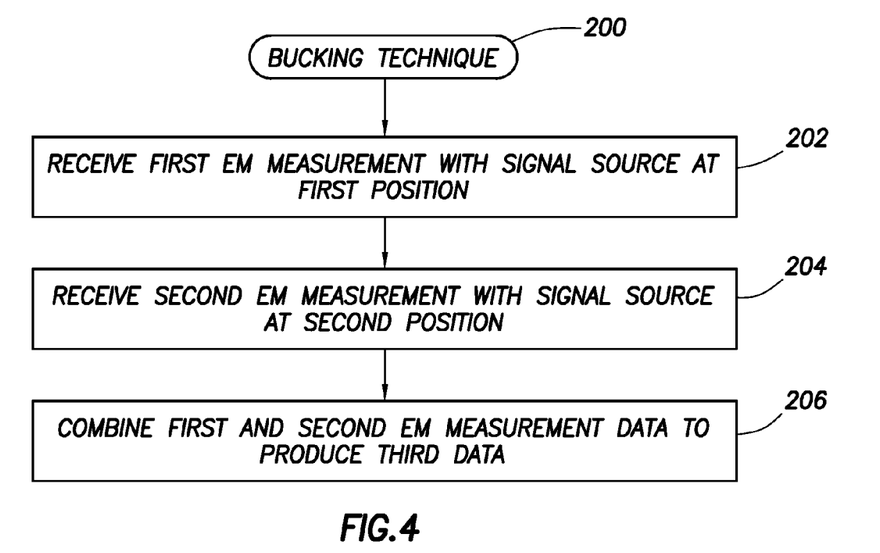
FIG. 4 is a flow diagram of the bucking processing technique according to the present disclosure.

Referring to FIG. 4, a bucking technique 200 (which can be performed by the software 118 of FIG. 1) includes receiving (at 202) a first electromagnetic field measurement ($E_1$ according to Eq. 2) with the signal source 102 at the first position to provide first measurement data, and receiving (at 204) a second electromagnetic field measurement ($E_2$ according to Eq. 2) with the signal source 102 at the second position to provide second measurement data. The measurements are associated with the same type of receiver (i.e., the measurements are either electric field measurements or magnetic field measurements) and are associated with the same receiver polarization (i.e., inline or crossline). The first and second measurement data may then be combined (at 206) to generate third data ($E_{12}^B$ according to Eq. 2), which is insensitive to the air-wave effect and is sensitive to resistive bodies in the subterranean structure. Combining the first and second measurement data according to Eq. 2 involves adjusting the amplitude of the first measurement data ($E_1$) by multiplying $E_1$ by $$\left[ e^{-k_{sw}(Z_2-Z_1)} \left(\frac{R_1}{R_2}\right)^3 \right],$$

and then subtracting $E_2$ from the adjusted value.

MT-Stripping Processing Technique

As discussed above, another example processing technique that can be used is the MT-stripping technique. With the MT-stripping technique, the air-wave effect (or other undesired component) is approximated by a vertically diffusing plane wave at large offsets (an offset refers to the lateral distance between the transmitter 102 and the receiver 110). In other words, the air-wave effect (or other undesired component) is approximated using measurements made by the receiver 110 when the EM transmitter 102 is located a relatively far distance (large offset) from the receiver along with measurements made when the source is closer. Alternatively the air-wave effect (or other undesired component) is approximated using measurements made when the EM transmitter 102 is turned off along with measurements made when the transmitter is on. Effectively, the air-wave effect (or other undesired component) can be estimated based on combining measurements taken using the MT survey technique with measurements made when the transmitter is on but close enough to the receiver such that the airwave dominates the measured response. Since the EM transmitter 102 is far away or turned off, the receiver 110 measures signals that are responsive to EM fields generated naturally, such as within the earth's upper atmosphere. The estimated air-wave effect (or other undesired component) can then be removed from measurements taken using the CSEM survey technique to produce an output value used for more accurately determining the presence of thin resistive layers in the subterranean structure.

The horizontal electric field generated by the air-wave effect (referred to as the "air-wave horizontal electric field") can be estimated by multiplying the MT impedance (that is determined from MT measurements) by a horizontal CSEM magnetic field that is orthogonal to the CSEM electric field measurement. MT measurements refer to magnetic field and electric field measurements made by magnetic and electric field sensing elements in the receiver 110 when the EM transmitter 102 is turned off or located far away from the receiver 110. The horizontal CSEM magnetic field measurement refers to a magnetic field measured by magnetic field sensing element(s) in the receiver 110; and the CSEM electric field measurement refers to the electric field measured by electric field sensing element(s) in the receiver 110. The magnetic and electric field sensing elements in the receiver 110 lie in a horizontal plane (plane of the sea floor 104) to provide the horizontal magnetic and electric field measurements.

At larger offsets (between the transmitter and receiver) where the airwave effect is present in the measurements, the horizontal fields in the earth or sea water that are generated by the horizontally traveling lateral wave can be approximated by a vertically diffusing plane energy (which travels along direction z as depicted in FIG. 1). The plane energy in the vertical direction travels through sea water and air and diffuses through layers of the subterranean structure. The vertically diffusing plane energy is essentially an EM energy diffusing in the vertical direction z. If the diffusion of the EM energy is purely vertical, then the electric and magnetic fields associated with the EM energy in the z direction are horizontal (in the x and y directions of FIG. 1). In this scenario, the horizontal electric field in the x direction, is represented as $E_x^L$ is expressed as follows:

$$E_x^L = Z_{xy} \cdot H_y^L, \quad \text{(Eq. 4)}$$

where $E_x^L$ is the horizontal x-component of the lateral-wave-generated electric field, $H_x^L$ is the horizontal y-component of lateral-wave-generated magnetic field, and $Z_{xy}$ is the plane-wave-impedance of the medium. The "medium" refers to the medium in the subterranean structure 105.

The impedance $Z_{xy}$ can be obtained by making measurements of naturally occurring plane-wave fields using the MT survey technique. As noted above, MT measurements can be taken by either shutting off the EM transmitter 102 or by placing the EM transmitter 102 far away from a receiver such that the signal generated by the EM transmitter 102 has a magnitude below the magnitude of naturally occurring MT fields.

Using simplified theory, the MT impedance, $Z_{xy}^{MT}$, of the subterranean structure 105 for a one-dimensional earth is defined as:

$$Z_{xy}^{MT} = E_x^{MT}(f)/H_y^{MT}(f), \quad \text{(Eq. 5)}$$

where (f) designates an estimate of the MT impedance made at the specific frequency used in the CSEM survey. One-dimensional earth implies that the electrical properties only vary in the z direction (in other words, as far as a receiver can detect, the earth is made up of a series of uniform layers stacked on top of each other). A two-dimensional earth assumes that the earth varies in depth (z direction) as well as laterally in one direction. For example, the conductivity may vary in both the x and z directions, but would be invariant for constant z and x values along the y direction. A three-dimensional earth is the most general case in which earth properties vary in any direction.

Since the techniques according to some implementations are most useful for detecting thin resistive layers in a subterranean structure, a one-dimensional earth is assumed. However, in other implementations, the techniques described here can be extended for two-dimensional or three-dimensional earth assumptions.

If the lateral wave (or vertical plane energy) component is assumed to dominate the CSEM measurement, the plane-energy electric field can be estimated by multiplying the magnetic field measured in the CSEM survey by the MT determined impedance. In other words, the electric field that is generated by the lateral wave is estimated as:

$$E_x^L \approx Z_{xy}^{MT} \cdot H_y^{CSEM}. \quad \text{(Eq. 6)}$$

Thus; the horizontal electric field $E_x^L$ induced by the air-wave effect is estimated using a value, $Z_{xy}^{MT}$, derived using measurements according to a survey technique (the MT survey technique) that is insensitive to presence of a thin resistive body in the subterranean structure. This estimation is possible because the air-wave response in CSEM measurement data is described by a vertically diffusing EM energy (in the z direction), and MT measurements measure only this type of response. Subtracting the $E_x^L$ term from the CSEM measured electric field defines a new output value, which is called the "scattered" electric field $E^{scat}$:

$$E_x^{scat} = E_x^{CSEM} - Z_{xy}^{MT} \cdot H_y^{CSEM}. \quad \text{(Eq. 7)}$$

where $E_x^{CSEM}$ represents the electric field measured by the electric field sensing element of the receiver 110 in the x direction, and $H_y^{CSEM}$ represents the magnetic field in the y direction measured by the magnetic field sensing elements.

The scattered electric field $E^{scat}$ represents the electric field with the lateral wave electric field removed (in other words, the scattered electric field $E^{scat}$ represents the electric field derived from the measurements made by the receiver 110 with the air-wave effect removed).

Note that the same process can be applied to remove the air-wave effects from the magnetic fields:

$$H_y^{scat} = H_y^{CSEM} - E_x^{CSEM}/Z_{xy}^{MT}, \quad \text{(Eq. 8)}$$

where $H_y^{scat}$ represents the magnetic field with the lateral-wave-generated magnetic field ($H_y^L \approx E_x^{CSEM}/Z_{xy}^{MT}$) removed to remove the air-wave response. According to Eqs. 6-8, field values ($E_x^L$ or $H_y^L$) representing fields induced by the air-wave effect are derived by combining an impedance ($Z_{xy}^{MT}$) that is free of the air-wave effect with CSEM-measured field values ($Hy^{CSEM}$ or $E_x^{CSEM}$) that are subject to the air-wave effect.

Because the lateral wave-generated components (electric field or magnetic field components) in Eqs. 7 and 8 are being approximated with the total CSEM field measurements (e.g., $H_y^L$ based on $E_x^{CSEM}$ measurements and $E_y^L$ based on $H_y^{CSEM}$ measurements), the method of air-wave removal outlined in Eqs. 7 and 8 works best for those conditions where the CSEM measurements are dominated by the air-wave effect.

A similar operation for air-wave removal can be performed on the measured impedances themselves. In other words:

$$Z_{xy}^{scat} = Z_{xy}^{CSEM} - Z_{xy}^{MT}, \quad \text{(Eq. 9)}$$

where $Z_{xy}^{CSEM} = E_x^{CSEM}/H_y^{CSEM}$. The impedance $Z_{xy}^{scat}$ represents the impedance with the air-wave effect removed. The use of the impedances rather than (electric or magnetic) field values in CSEM interpretation has the benefit of the impedance being independent of source amplitude and phase tracking problems, and is less susceptible to geometry errors associated with relative source and receiver positioning. In addition, there are no assumptions of the air-wave dominance in this expression (Eq. 9), and thus it can be used in deep water as well as shallow water.

In two-dimensional and three-dimensional earth environments, the MT measured impedance is a 2×2 tensor rather than scalar. For a general three-dimensional earth, the tensor has the form:

$$Z = \begin{bmatrix} Z_{xx} & Z_{xy} \\ Z_{yx} & Z_{yy} \end{bmatrix}. \quad \text{(Eq. 10)}$$

In other words, z is assumed to lie diagonally in a horizontal direction that has an angular offset with respect to the x and y directions. In these cases, the MT impedance used in the expressions above (Eqs. 7-9) would be the corresponding off-diagonal component for an alignment that is consistent with that used for the CSEM data. This may involve rotation of the impedance tensor.

The above techniques assume that MT measurement data is taken in a present survey job. In alternative implementations, if no MT data were available but a numerical model existed that was constructed from other data (for example a previous MT survey or short-offset CSEM data where the air-wave effect is not a problem), the MT impedance could be estimated by using a modeling technique.

Figure 5:
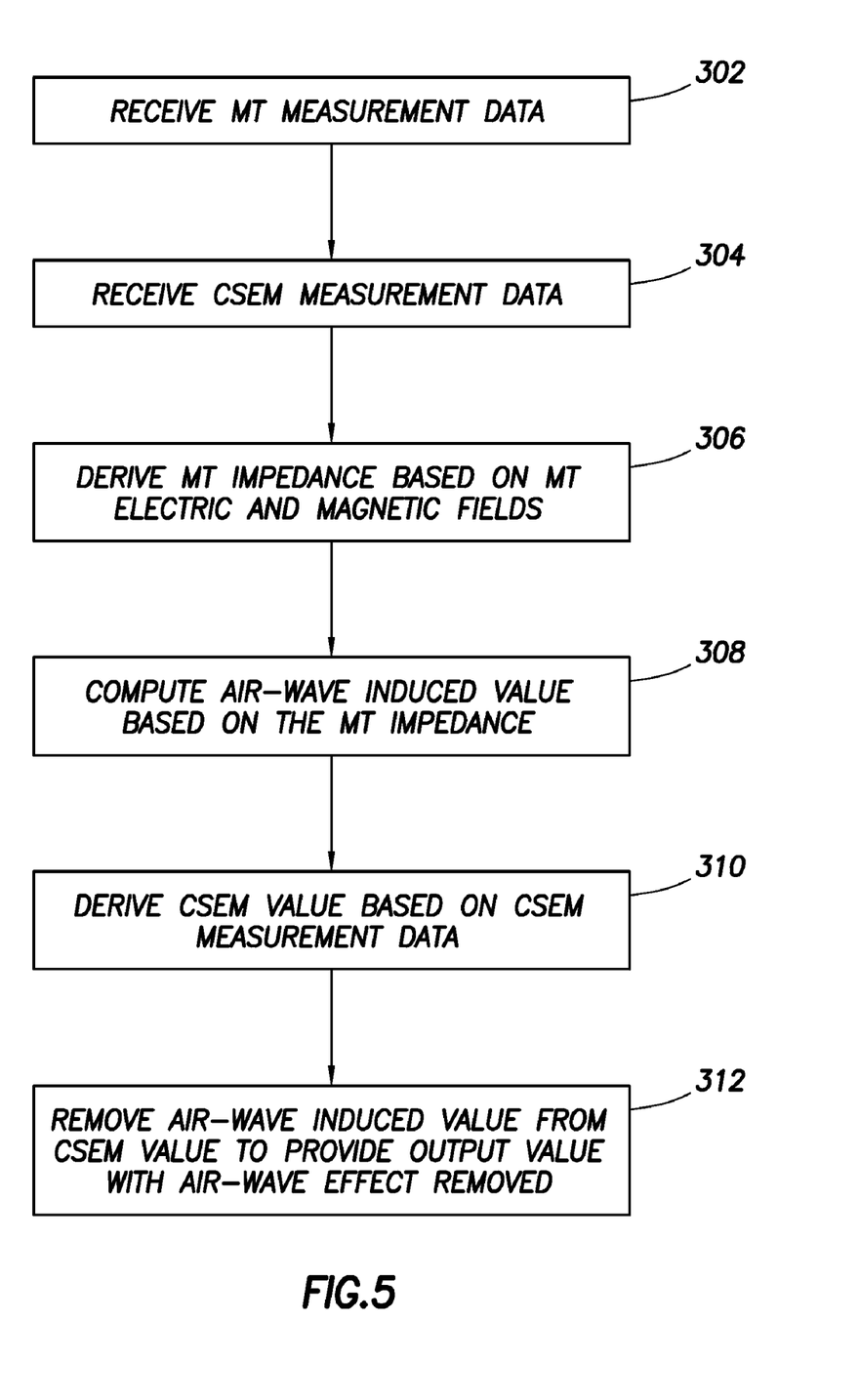
FIG. 5 is a flow diagram of a magnetotelluric (MT)-stripping processing technique, according to the present disclosure.

FIG. 5 shows a general flow according to some implementations. MT measurement data is received (at 302) at each receiver 110. As noted above, the MT measurement data is received when the EM transmitter 102 is far away from the receiver, or when the CSEM transmitter is turned off. Alternatively, task 302 can be skipped if MT measurements are not possible or not available.

CSEM measurement data is then received (at 304) by positioning the transmitter 102 a closer distance to each receiver 110. Next, the MT impedance is derived (at 306) based on MT electric and magnetic fields, according to Eq. 5. The MT impedance is derived for a frequency at which the CSEM survey is expected to be performed. If MT measurement data is not available, then the MT impedance may be estimated using a modeling technique.

Next, an air-wave induced value (which can be an electric field according to Eq. 6, a magnetic field according to Eq. 8, or the MT impedance itself according to Eq. 9) is computed (at 308) based on the MT impedance. A CSEM value is derived (at 310) based on the CSEM measurement data, where the CSEM value can be an electric field, $E_x^{CSEM}$; a magnetic field, $H_y^{CSEM}$; or an impedance, $Z_{xy}^{CSEM}$. The airwave induced value (calculated at 308) is removed (such as by subtraction) from the CSEM value (computed at 310) to provide (at 312) an output value (e.g., $E_x^{scat}$, $H_y^{scat}$, or $Z_{xy}^{scat}$) with the air-wave effect removed.

Figure 6:
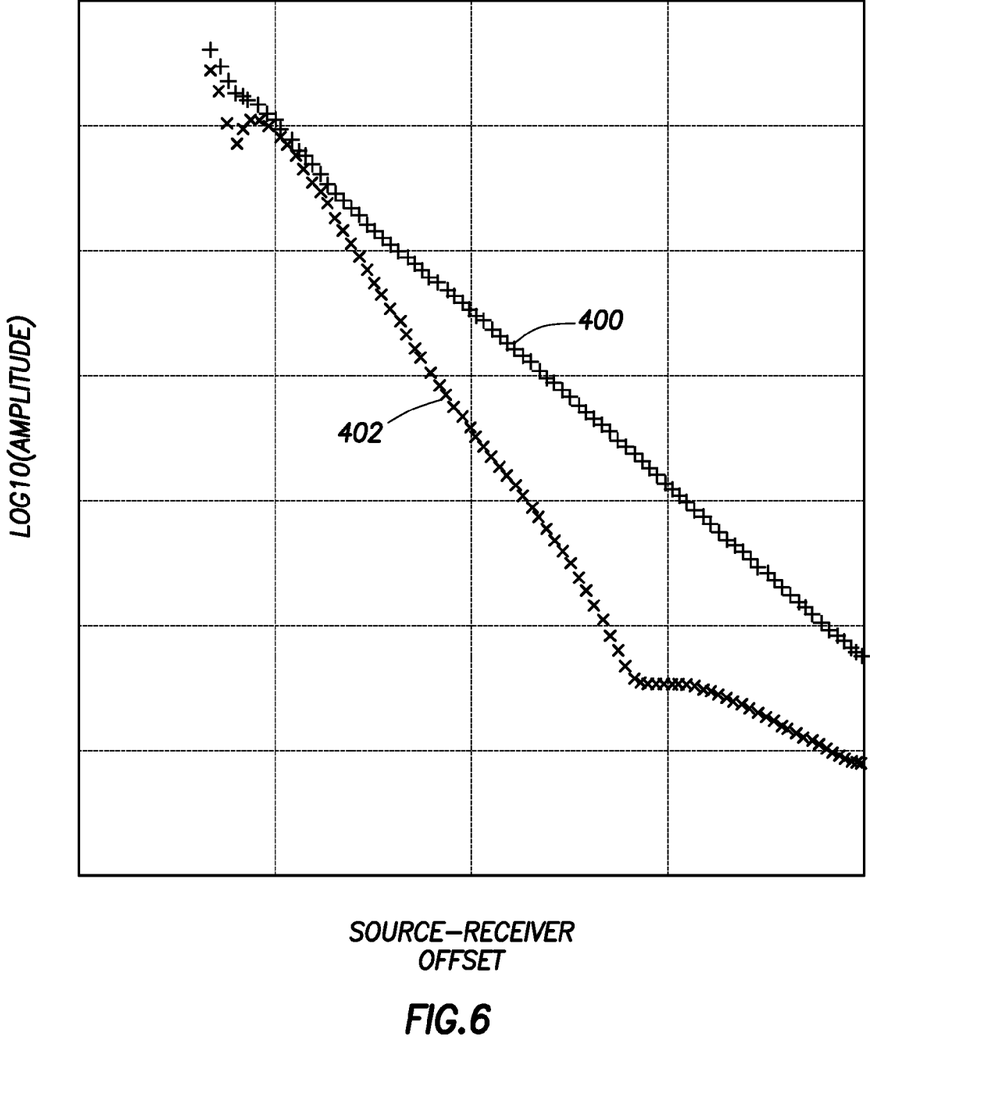
FIGS. 6-7 are graphs illustrating relationships of signal amplitudes as functions of source-receiver offsets for the bucking and MT-stripping processing techniques according to the present disclosure, respectively.

FIG. 6 depicts a graph showing curves 400 and 402 representing simulated data produced using the bucking processing technique. The curve 400 represents amplitudes as a function of source-receiver offset when a resistive body is present, and curve 402 represents amplitudes as a function of source-receiver offset when a resistive body is not present in the subterranean structure. As depicted in FIG. 6, with the lateral wave reduced or eliminated using the bucking technique, a detectable separation is provided between the curve 400 and curve 402 at certain source-transmitter offsets. This separation allows for more accurate characterization of the subterranean structure 105 to better detect whether or not the resistive body 109 is present in the subterranean structure.

Figure 7:
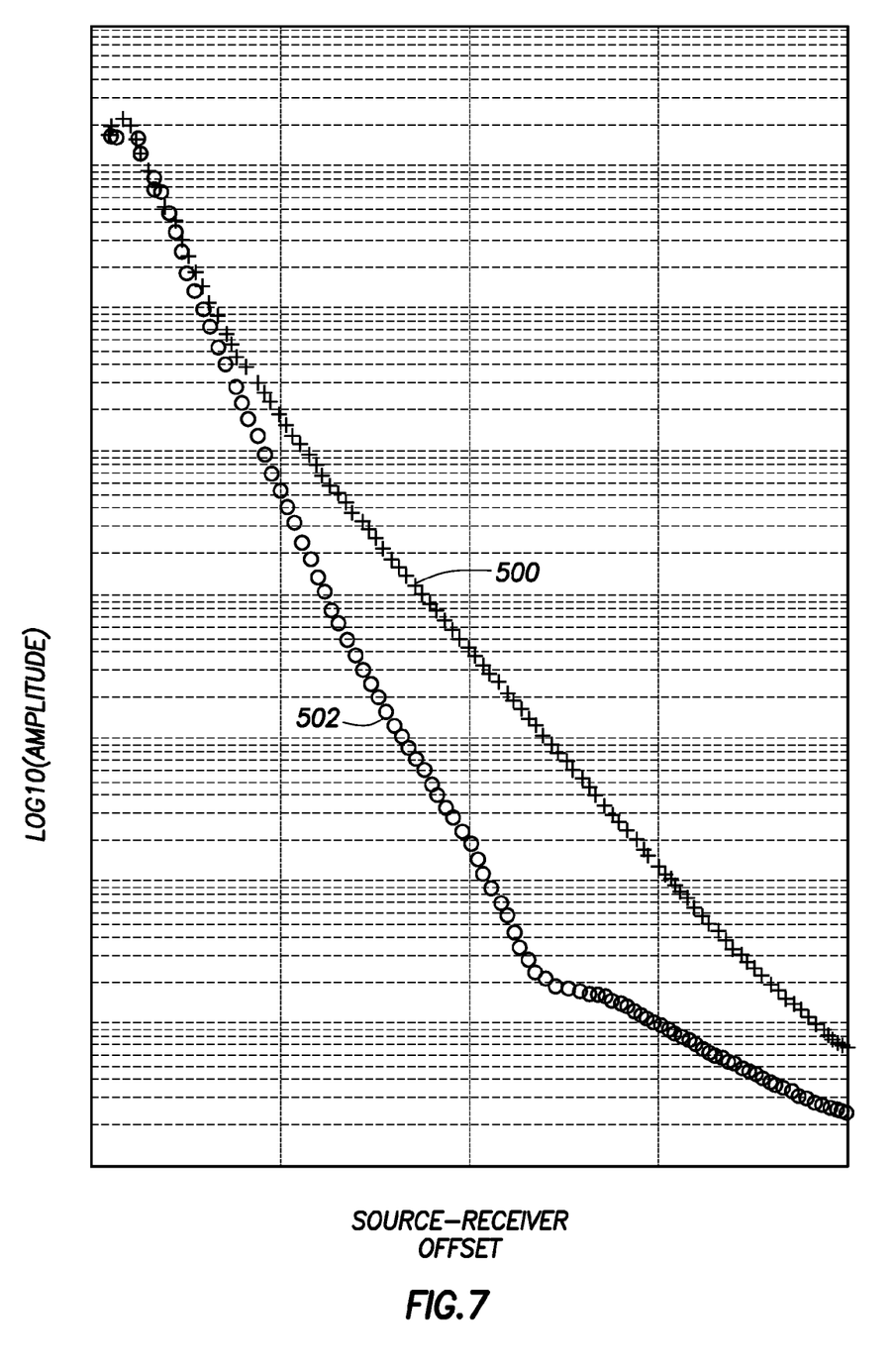

FIG. 7 depicts another graph showing curves 500 and 502 representing simulated data produced using the MT-stripping technique. The curve 500 represents amplitudes as a function of source-receiver offset when a resistive body is present, and curve 502 represents amplitudes as a function of source-receiver offset when a resistive body is not present in the subterranean structure. As depicted in FIG. 7, with the lateral wave reduced or eliminated, a detectable separation is provided between the curve 500 and curve 502 at certain source-transmitter offsets.

Instructions of software described above (e.g., software 118 of FIG. 1) are loaded for execution on a processor (such as one or more CPUs 120 in FIG. 1). The processor includes microprocessors, microcontrollers, processor modules or subsystems (including one or more microprocessors or microcontrollers), or other control or computing devices.

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs) erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

While the invention has been disclosed with respect to a limited number of embodiments, those skilled in the art, having the benefit of this disclosure, will appreciate numerous modifications and variations therefrom. It is intended that the appended claims cover such modifications and variations as fall within the true spirit and scope of the invention.

What is claimed is:

1. A method of processing survey data representing a subterranean structure, comprising:
   receiving measurement data collected by a receiver positioned at a depth of greater than or equal to 300 meters in a body of water, wherein the collected measurement data is responsive to signals emitted by a signal source while the signal source is at a depth closer to an air-water interface of the body of water than to the depth of the receiver, wherein receiving the measurement data comprises receiving first measurement data with the signal source at a first position, and second measurement data with the signal source at a second position; and
   processing, by a processor, the measurement data to reduce a predetermined signal component,
   wherein processing the measurement data comprises combining the first and second measurement data to produce data with the predetermined signal component removed.

2. The method according to claim 1, wherein processing the measurement data to reduce the predetermined signal component comprises processing the measurement data to reduce a signal component that is insensitive to thin resistive layers under a sea floor.

3. The method according to claim 1, wherein the predetermined signal component comprises at least one of an air wave effect, a direct wave effect, and a combination thereof.

4. A method of processing survey data representing a subterranean structure, comprising:
   receiving measurement data collected by a receiver positioned at a depth of greater than or equal to 300 meters in a body of water, wherein the collected measurement data is responsive to signals emitted by at least one signal source while the at least one signal source is at a depth closer to an air-water interface of the body of water than to the depth of the receiver, wherein receiving the measurement data comprises receiving first measurement data with the at least one signal source at a first position, and second measurement data with the at least one signal source at a second position; and
   processing, by a processor, the measurement data to reduce a predetermined signal component, wherein processing the measurement data comprises combining the first and second measurement data to produce data with the predetermined signal component removed,
   wherein the first position is represented by a first depth and a first offset between the signal source and the receiver, wherein the second position is represented by a second depth and a second offset between the signal source and the receiver, and wherein combining the first and second measurement data comprises:
      adjusting the first measurement data by taking a ratio of the first offset to the second offset, and by calculating an exponential function based on a difference between the first and second depths; and
      subtracting the second measurement data from the adjusted first measurement data.

5. A method of processing survey data representing a subterranean structure, comprising:
   receiving measurement data collected by a receiver positioned at a depth of greater than or equal to 300 meters in a body of water, wherein the collected measurement data is responsive to signals emitted by at least one signal source located closer to the air-water interface of the body of water than to the receiver; and
   processing the measurement data to reduce a predetermined signal component,
   wherein receiving the measurement data comprises receiving first measurement data with the at least one signal source at a first position, and second measurement data with the at least one signal source at a second position, and
   wherein processing the measurement data comprises combining the first and second measurement data to produce data with the predetermined signal component removed,
   wherein combining the first and second measurement data comprises:
      adjusting the first measurement data; and
      subtracting the second measurement data from the adjusted first measurement data,
   wherein the first measurement data is a first measured electric field $E_1$, and the second measurement data is a second electric field $E_2$, and wherein combining the first and second measurement data comprises calculating $E_{12}^B$ according to:

$$E_{12}^B = E_1\left[e^{-k_{sw}(Z_2-Z_1)}\left(\frac{R_1}{R_2}\right)^3\right] - E_2,$$

where $R_1$ represents a lateral offset between the signal source at the first position and the receiver, $Z_1$ represents a depth of the signal source at the first position from the air-water interface, $R_2$ represents a lateral offset between the signal source at the second position and the receiver, $Z_2$ represents a depth of the signal source at the second position from the air-water interface, and $k_{sw}$ represents a propagation constant of the body of water.

6. A method of processing survey data representing a subterranean structure, comprising:
receiving measurement data collected by a receiver positioned at a depth of greater than or equal to 300 meters in a body of water, wherein the collected measurement data is responsive to signals emitted by at least one signal source while the at least one signal source is at a depth closer to an air-water interface of the body of water than to the depth of the receiver; and
processing, by a processor, the measurement data to reduce a predetermined signal component,
wherein receiving the measurement data comprises:
receiving first measurement data according to a first electromagnetic survey technique; and
receiving second measurement data according to a second, different electromagnetic survey technique,
wherein processing the measurement data comprises:
computing a first value based on the first measurement data, wherein the first measurement data is insensitive to presence of a thin resistive body in the subterranean structure;
computing a second value based on the second measurement data, wherein the second measurement data is sensitive to presence of the thin resistive body in the subterranean structure; and
removing an effect of the first value from the second value to reduce the predetermined signal component,
wherein computing the first value comprises computing the first value having an impedance component representing the impedance of the subterranean structure.

7. The method according to claim 6, wherein receiving the first measurement data is according to a magnetotelluric (MT) survey technique, and receiving the second measurement data is according to a controlled source electromagnetic (CSEM) survey technique.

8. A method of processing survey data representing a subterranean structure, comprising:
receiving measurement data collected by a receiver positioned at a depth of greater than or equal to 300 meters in a body of water, wherein the collected measurement data is responsive to signals emitted by at least one signal source while the at least one signal source is at a depth closer to an air-water interface of the body of water than to the depth of the receiver; and
processing, by a processor, the measurement data to reduce a predetermined signal component,
wherein receiving the measurement data comprises:
receiving first measurement data according to a first electromagnetic survey technique; and
receiving second measurement data according to a second, different electromagnetic survey technique,
wherein processing the measurement data comprises:
computing a first value based on the first measurement data, wherein the first measurement data is insensitive to presence of a thin resistive body in the subterranean structure;
computing a second value based on the second measurement data, wherein the second measurement data is sensitive to presence of the thin resistive body in the subterranean structure; and
removing an effect of the first value from the second value to reduce the predetermined signal component,
wherein computing the first value comprises computing an estimate of a field induced by an air-wave effect.

9. The method according to claim 8, wherein computing the second value comprises computing a field generated in response to at least one electromagnetic signal transmitted from the at least one signal source.

10. The method according to claim 8, further comprising towing at least one signal source using a sea vessel.

11. An article comprising at least one non-transitory computer-readable storage medium containing instructions that when executed cause a computer to:
receive measurement data collected by a receiver positioned at a depth of greater than or equal to 300 meters in a body of water, wherein the collected measurement data is responsive to signals emitted by a signal source while the signal source is at a depth closer to an air-water interface of the body of water than to the depth of the receiver, wherein receiving the measurement data comprises receiving first measurement data with the signal source at a first position, and second measurement data with the signal source at a second position; and
process the measurement data to reduce a predetermined signal component,
wherein processing the measurement data comprises combining the first and second measurement data to produce data with the predetermined signal component removed.

12. The article according to claim 11, wherein combining the first and second measurement data comprises:
adjusting the first measurement data; and
subtracting the second measurement data from the adjusted first measurement data.

13. The article of claim 12, wherein the first measurement data is a first measured electric field $E_1$, and the second measurement data is a second electric field $E_2$, and wherein combining the first and second measurement data comprises calculating $E_{12}^B$ according to:

$$E_{12}^B = E_1\left[e^{-k_{sw}(Z_2-Z_1)}\left(\frac{R_1}{R_2}\right)^3\right] - E_2,$$

where $R_1$ represents a lateral offset between the signal source at the first position and the receiver, $Z_1$ represents a depth of the signal source at the first position from the air-water interface, $R_2$ represents a lateral offset between the signal source at the second position and the receiver, $Z_2$ represents a depth of the signal source at the second position from the air-water interface, and $k_{sw}$ represents a propagation constant of the body of water.

14. The article according to claim 11, wherein the predetermined signal component comprises at least one of an air wave effect, a direct wave effect, and a combination thereof.

15. An article comprising at least one non-transitory computer-readable storage medium containing instructions that when executed cause a computer to:
  receive measurement data collected by a receiver positioned at a depth of greater than or equal to 300 meters in a body of water, wherein the collected measurement data is responsive to signals emitted by at least one signal source while the at least one signal source is at a depth closer to an air-water interface of the body of water than to the depth of the receiver, wherein receiving the measurement data comprises receiving first measurement data with the at least one signal source at a first position, and second measurement data with the at least one signal source at a second position; and
  process the measurement data by combining the first and second measurement data to produce data with a predetermined signal component reduced,
  wherein the first position is represented by a first depth and a first offset between the signal source and the receiver, wherein the second position is represented by a second depth and a second offset between the signal source and the receiver, and wherein combining the first and second measurement data comprises:
    adjusting the first measurement data by taking a ratio of the first offset to the second offset, and by calculating an exponential function based on a difference between the first and second depths; and
    subtracting the second measurement data from the adjusted first measurement data.

16. A method, comprising:
  positioning a source at a near-surface depth in a body of water;
  collecting measurement data for at least a first lateral source position and a second lateral source position;
  adjusting an amplitude of one measurement data point for the first lateral source position; and
  calculating a bucking-out value based on the adjusted amplitude of the measurement data point for the first lateral source position and a second measurement data point for the second lateral source position,
  wherein calculating the bucking-out value is according to the equation:

$$E_{12}^B = E_1\left[e^{-k_{sw}(Z_2-Z_1)}\left(\frac{R_1}{R_2}\right)^3\right] - E_2;$$

where $E_1$ is the one measurement data point for the first lateral source position, $E_2$ is the second measurement data point for the second lateral source position, where $R_1$ is a lateral offset between the source and at least one receiver, $Z_1$ is a depth of the source, the first lateral source position being represented by $R_1$ and $Z_1$, while $R_2$ is a lateral offset between the source and the receiver for the second lateral source position of the source, $Z_2$ is the depth of the source at the second lateral source position, and $k_{sw}$ is a propagation constant.

17. The method according to claim 16, further comprising positioning the receiver at the seabed.

18. The method according to claim 17, wherein the propagation constant $k_{sw}$ is expressed as:
  $k_{sw}=\sqrt{2\pi i f \mu \sigma_{sw}}$, where the notation i represents the square root of negative one ($\sqrt{-1}$), f represents the signal frequency, $\mu$ represents the magnetic permeability of free space ($\mu=\mu p=4\pi\times10^{-7}$H/m), and $\sigma_{sw}$ is the conductivity of seawater.

19. The method according to claim 16, further comprising applying the bucking-out value to eliminate an undesired component.

* * * * *